United States Patent [19]

Dorris

[11] Patent Number: 5,027,527
[45] Date of Patent: Jul. 2, 1991

[54] AIR-COOLING SYSTEM FOR PRECISION MEASURING MACHINES

[75] Inventor: Albert W. Dorris, Hawthorne, Calif.

[73] Assignee: Hughes Aircraft Company, Los Angeles, Calif.

[21] Appl. No.: 401,207

[22] Filed: Aug. 31, 1989

[51] Int. Cl.⁵ .................... G05D 23/00; B23B 19/00
[52] U.S. Cl. ................................. 33/783; 33/704; 33/DIG. 19; 82/900; 236/DIG. 9
[58] Field of Search ................ 33/701, 702, 703, 704, 33/783, DIG. 29, 803, 809, 810, 811, 812; 82/900; 236/DIG. 9

[56] References Cited

U.S. PATENT DOCUMENTS

| | | | |
|---|---|---|---|
| 2,725,775 | 12/1955 | Leifer | 82/900 |
| 2,956,344 | 10/1960 | Rantsch | 33/803 |
| 3,303,731 | 2/1967 | Zawistowski | 82/900 |
| 4,100,837 | 7/1978 | Köhler | 33/702 |
| 4,449,085 | 5/1984 | Gomoll | 82/900 |
| 4,481,715 | 11/1984 | Gilmore | 33/778 |
| 4,534,686 | 8/1985 | Nakamura et al. | 82/900 |
| 4,549,354 | 10/1985 | Affa et al. | 33/702 |
| 4,573,359 | 3/1986 | Carstensen | 33/561.2 |
| 4,719,830 | 1/1988 | Kawada et al. | 82/900 |
| 4,831,737 | 5/1989 | Grund | 33/702 |

FOREIGN PATENT DOCUMENTS 0987367  1/1982  U.S.S.R. ............................ 33/783

Primary Examiner—William A. Cuchlinski, Jr.
Assistant Examiner—C. W. Fulton
Attorney, Agent, or Firm—Leonard A. Alkov; Wanda K. Denson-Low

[57] ABSTRACT

Precision measuring machine (10) has a bed (12) with a tailstock (14) and headstock (16) mounted thereon. Anvils (36, 42) are respectively mounted on the tailstock and headstock. Duct walls enclose the lower portion of the bed so that fan (62) can move air therepast. Cap shrouds (72, 82) receive air from fan shrouds (68, 84) to flood air over the tailstock and headstock. Anvil shrouds (76, 90) respectively cover anvils (36, 42) and receive air through tubes (80, 92) to also flood the anvils with air. In this way, the precision measuring machine is bathed in ambient air to reduce dimensional changes due to temperature changes.

12 Claims, 2 Drawing Sheets

AIR-COOLING SYSTEM FOR PRECISION MEASURING MACHINES

FIELD OF THE INVENTION

This invention is directed to precision measuring machines, and particularly an air circulating system which aids in quickly stabilizing machine temperature and preferably includes temperature sensors to indicate excessive rates of temperature change of parts of the machine.

BACKGROUND OF THE INVENTION

Because of the thermal coefficient of expansion of the parts of a measuring machine, stable temperatures are required for accurate measurement. Precision measuring machines have heavy beds, heavy measuring stocks and heavy tailstocks. An anvil is fixed on the tailstock, and a movable anvil is fixed on the headstock. The movable anvil has a precision readout gage thereon. The anvils are placed at a known distance from each other by movement of the headstock and/or tailstock by use of a reference or standard gage block therebetween. The reference block is removed and a part to be measured is placed therein. The readout indicates the difference in dimension between the standard block and the part now between the anvils. The moving anvil and its readout have a very small movement so that movement of the stock on the bed and recalibration are often required. The physical handling of the stocks and even the radiation from the hands when positioning parts to be measured put heat into the measuring machine. The increase in temperature causes dimensional changes in the machine to reduce the measuring accuracy thereof. It is necessary to wait until the temperature is again stabilized before measuring can proceed. Thus, there is need for a way to decrease the amount of heat entering the precision measuring machine and to quickly remove heat added thereto.

SUMMARY OF THE INVENTION

In order to aid in the understanding of this invention, it can be stated in essentially summary form that it is directed to a air-cooling system for precision measuring machines wherein various parts of the machines are provided with fans, duct work and shrouds to move ambient air around the parts of the precision measuring machine to quickly stabilize its temperature.

It is thus a purpose and advantage of this invention to provide an air-cooling system which quickly returns the parts of a precision measuring machine to close to room ambient temperature so as to avoid physical excursions of parts of the measuring machine as a result of thermal deviation and to return the precision measuring machine to a stable temperature as quickly as possible.

It is another purpose and advantage of this invention to place shrouds over parts of the precision measuring machine to act as radiation shields and to deliver ambient air to the shrouds to reduce heat radiated by the operator's hands and body from being absorbed by critical heat-sensitive components of the measuring machine and to remove heat from the machine parts.

It is another purpose and advantage of this invention to improve the measurement accuracy and reduce the time spent in making measurements which require optimum accuracy by reducing radiation to the parts of the precision measuring machine and quickly stabilize temperature thereof.

Other purposes and advantages of this invention will become apparent from a study of the following portion of this specification, the claims and the attached drawings wherein:

DESCRIPTION OF THE PREFERRED EMBODIMENT

Figure 1:
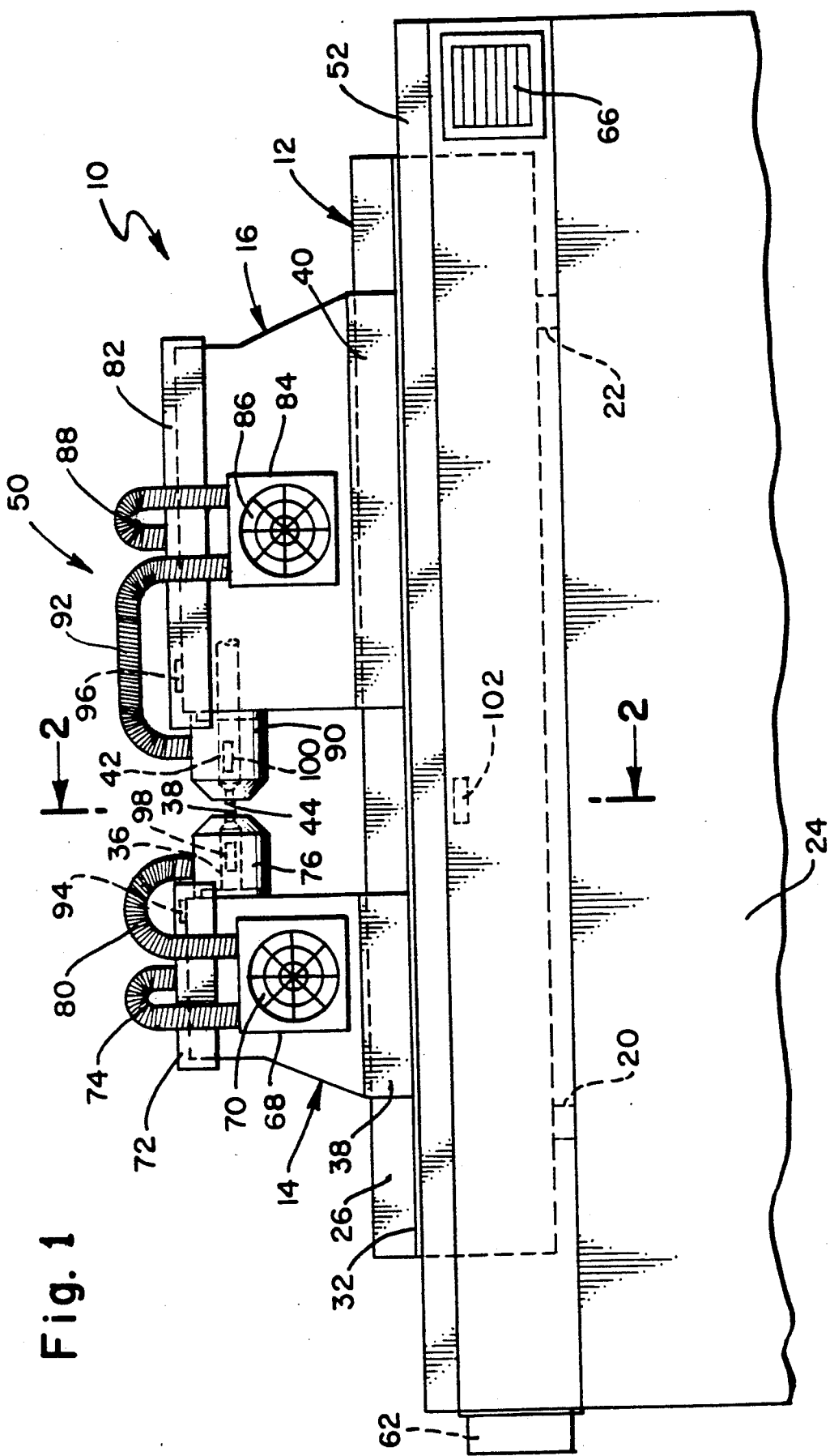
FIG. 1 is a rear-elevational view of a precision measuring machine having in association therewith the air-cooling system in accordance with this invention.
Figure 2:
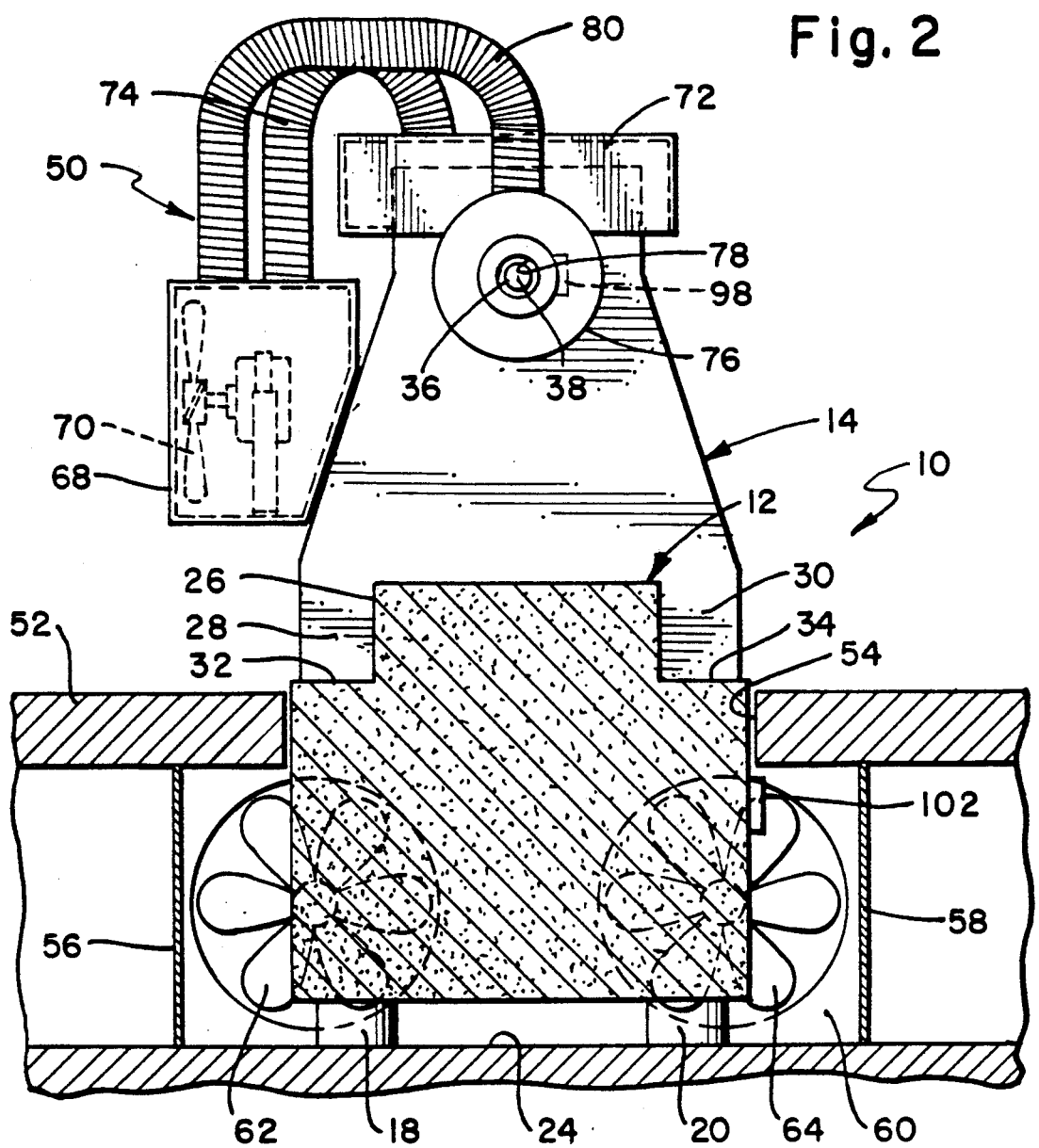
FIG. 2 is an enlarged section taken generally along the line 2—2 of FIG. 1.

The precision measuring machine is generally indicated at 10 in FIGS. 1 and 2. It comprises three principal parts, bed 12, tailstock 14, and headstock 16. The bed is a heavy member to resist deflections due to stress and to resist deflections due to temperature changes by reason of its mass. Granite is often used as a bed. Bed 12 is supported by legs, of which legs 18 and 20 are seen in FIG. 2 and legs 20 and 22 are seen in FIG. 1. The legs, in turn, rest on a convenient support 24. Tailstock 14 is slidably mounted on the bed by means of interengaging ways. Way 26 is an upstanding rectangular section on the bed which is received between way flanges 28 and 30 on the tailstock. The lower surfaces of the way flanges respectively rest on way surfaces 32 and 34, which provide support for the tailstock. The ways are as straight and true as possible to provide firm support. Anvil 36 is rigidly mounted on the tailstock 14 and extends generally parallel to the ways. Anvil 36 has an anvil face 38 which serves as a measuring surface.

Headstock 16 is very similar, with a pair of downwardly extending way flanges which embrace upstanding way 26. Way flange 40 is seen in FIG. 1. Headstock 16 has an anvil 42 mounted therein. Anvil face 44 is directly in line with anvil face 38 so that measuring can take place therebetween. Anvil 42 has a small excursion with respect to headstock 16 with a measuring device interengaging therebetween. In view of the high accuracy desired, the excursion is very small. An electrical strain gage, together with bridge and measuring circuit or like system, is incorporated in the headstock to measure the excursion of the anvil 42 from its reference position.

In use, a measuring standard is placed between the anvils, and the anvils are brought together to touch the measuring standard. The measuring standard may be gage blocks, gage pins, or the like. When the measuring standard is removed, the part to be measured is placed between the anvils, and the difference between the part being measured and the standard is noted by relative motion of the anvil 42 with respect to headstock 16. In order to obtain accurate measurements, the dimensions of the headstock, bed and tailstock must remain constant between the placement of the measuring standard and the placement of the part to be measured. The physical handling of the stocks to place them against the measuring standard and the placement of the part to be measured between the anvils adds heat to all of the parts as a result of conduction and radiation from the operator.

To minimize this heat input and to maximize the rate of removal of the heat added by such sources, the air-cooling system 50 of this invention is provided. Like the precision measuring machine 10, the air-cooling system 50 comprises three principal subassemblies. Table top 52 is mounted on support 24 and has an opening 54 therein so that it surrounds t bed, but is separated therefrom. Between support 24 and table top 52, duct walls 56 and 58, see FIG. 2, define a duct 60 which surrounds the lower portion of the bed. Fans 62 and 64 are positioned at one end of the duct to move ambient air through the duct to circulate it around the bed. Vent opening 66, see FIG. 1, controls the flow of air so that it passes generally along the length of the bed. Thus, the lower portion of the bed is bathed in moving ambient air. Furthermore, some of the air passes through the opening 54 so that the upper part of the bed also has air moving thereover. It is understood that the measuring machine 10 is located in a space where the air temperature is closely controlled so that ambient air in the control space can be employed as a constant temperature cooling medium.

The tailstock and headstock are also bathed in ambient air. Referring first to the tailstock 14, fan housing 68 is mounted thereon and has a fan 70 therein. Shroud 72 is a cap which is positioned over and surrounds and is spaced from the top of the tailstock. Shroud 72 is connected by duct 74 to fan housing 68 to receive air therefrom. Shroud 72 is spaced above the tailstock and has walls extending downwardly and spaced around the sides of the upper part of the tailstock so as to bathe the tailstock in a curtain of descending air coming down from the shroud. As seen in FIG. 1, the shroud 72 also extends over the front and back of the tailstock to bathe the axial ends thereof in cooling air.

Anvil shroud 76 is mounted upon the forward end of the cap shroud 72 and surrounds the anvil 36. There is an opening 78 in the shroud around the anvil so that the tip of the anvil can extend therethrough so that the anvil face is exposed. This is circular opening 78 and is seen in FIG. 2 as permitting air to be discharged around the tip of the anvil. The anvil shroud 76 need not be tight against the face of the tailstock 14 because some discharge of air therethrough is not harmful. Air is supplied to the anvil shroud by means of flexible tubing duct 80 which delivers air from the top of the fan housing 68 to the anvil shroud 76. In this way, air is delivered around the anvil and down the tailstock on all sides.

Headstock 16 also has a cap shroud 82 thereon which overlaps the headstock on all sides and directs air downwardly around all sides of the headstock. Fan housing 84 is mounted on the headstock 16 and contains fan 86 therein to deliver air through duct 88 into the cap shroud 82. In addition, anvil shroud 90 surrounds anvil 42, but is spaced from the anvil around its nose so that the nose and the measuring face of the anvil extend out of the shroud 90. Flexible tube 92 delivers air from fan housing 84 to anvil shroud 90 so that ambient air is delivered to flood the entire upper exposed surfaces of the headstock and anvil.

The result of this air-cooling system is to maintain the critical heat-sensitive parts of the measuring machine at as near a constant temperature as possible. During normal operation of this type of equipment, a temperature rise is encountered. Heat is radiated by the operator's body, particularly his hands. This heat is absorbed by the machine with undesirable expansion of the parts, causing inaccurate and unreliable measurement results. The shrouding of some parts of the machine reduces the radiation heat input, and the flooding of the machine with ambient air which is at a substantially constant temperature significantly reduces the structural changes due to temperature changes. The shrouds may be fabricated of fiber-reinforced synthetic polymer composition material. The four cooling fans provide the desired air flow, and the shrouds and ducts direct the air to provide the desired cooling. Tests of the precision measuring machine 10 with and without the air-cooling system of this invention, using the same test procedures, show that there is an eight-fold improvement in measuring accuracy by use of the air-cooling system of this invention.

Figure 3:
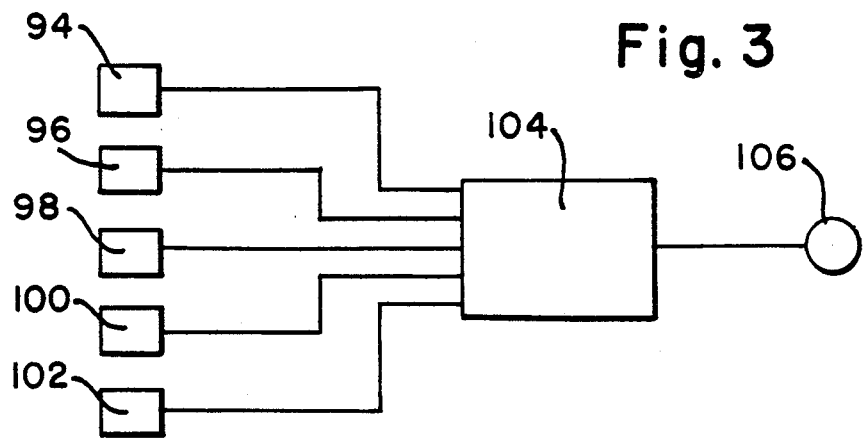
FIG. 3 is a block diagram showing the temperature change measuring system in accordance with this invention.

The factor which reduces accuracy is the change in temperature of precision measuring machine parts during a measurement run, and not the temperature itself. FIG. 3 shows a signal system which has five temperature sensors 94, 96, 98, 100 and 102 which are connected to temperature rate of change detector 104 which, in turn, is connected to signal device 106, which is an audible or visible alarm. Five temperature sensors are illustrated, but more may be used. In FIG. 1, the sensors are illustrated as being respectively placed on the top of the tailstock near the anvil, on the top of the headstock near the anvil, on the tailstock anvil, on the headstock anvil, and on the front of the bed. As is seen with respect to sensor 98 and 102, shown in larger scale in FIG. 2, the sensors are each in contact with the part and each is covered with thermal insulation so that the sensed temperature is that of the part rather than ambient air. These sensors are shown as being located on the machine parts closest to the operator as he places between the anvils a part to be measured. These are the locations most likely to receive heat. More sensors may be employed, with several more located along the bed and with one preferably on each anvil. When the temperature of any one of these parts changes at a rate greater than a predetermined rate, the signal device 106 is actuated so that the operator can know that a temperature change is taking place, and recalibration may be required. The signal system thus is a protection against unexpected temperature changes of the measuring machine parts so as to signal unexpected dimensional changes.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A precision measuring machine having an air-cooling system thereon, said machine having a bed;
   a first member mounted on said bed, said first member comprising a tailstock, a tailstock anvil on said tailstock;
   a second member mounted on said bed, said second member comprising a headstock and a headstock anvil on said headstock for the measurement of a device therebetween;
   means for forcibly delivering air along said bed to maintain temperature stability of said bed;
   a fan on said tailstock and a fan on said headstock for respectively forcibly delivering air over said tailstock and said headstock to maintain temperature stability thereof so as to limit dimensional changes between said headstock and tailstock due to thermal changes.

2. The precision measuring machine of claim 1 wherein at least one of said tailstock and headstock is movable with respect to said bed.

3. The precision measuring machine of claim 1 further including:
a tailstock cap shroud over and surrounding the top of said tailstock and a headstock cap shroud over and surrounding the top of said headstock, said fan on said tailstock and said fan on said headstock respectively delivering air to said tailstock cap shroud and said headstock cap shroud so as to deliver air respectively over said tailstock and headstock.

4. The precision measuring machine of claim 3 further including:
a tailstock anvil shroud substantially surrounding said tailstock anvil and a headstock anvil shroud substantially surrounding said headstock anvil, said fan on said tailstock being connected to deliver air to said tailstock anvil shroud and said fan on said headstock being connected to deliver air to said headstock anvil shroud so that said anvils are shrouded and air is delivered therearound.

5. The precision measuring machine of claim 4 further including:
temperature sensors on said bed, said tailstock and said headstock and means for signaling when the rate of change of temperature sensed by said sensors exceeds a predetermined value.

6. An air-cooling system for a precision measuring machine having a bed, a tailstock and a headstock mounted on the bed and a tailstock anvil and headstock anvil respectively mounted on the tailstock and the headstock, said air-cooling system comprising:
a duct fully enclosing the sides, bottom and ends of the bed, a fan connected to said duct for delivering ambient air around the sides, bottom and ends of the bed;
a tailstock cap shroud for mounting over and depending partly down the sides of the tailstock, a fan connected to deliver ambient air to said tailstock cap shroud so that said tailstock cap shroud delivers ambient air over the top and down the sides of the tailstock;
a headstock cap shroud for mounting spaced over and extending partly down around the sides of the headstock, a headstock fan connected to said headstock cap shroud to deliver ambient air to said headstock cap shroud so that ambient air is delivered over the top of and down the sides of the headstock to minimize temperature changes to maintain dimensional stability.

7. The air-cooling system of claim 6 further including:
a tailstock anvil shroud mounted around the tailstock anvil and a tube connected to deliver air from said tailstock fan to said tailstock anvil shroud so that the tailstock anvil is supplied with ambient air.

8. The air-cooling system of claim 7 further including:
a headstock anvil shroud mounted around the headstock anvil and a tube connecting said headstock fan to said headstock anvil shroud so that ambient air is delivered to said headstock anvil shroud.

9. The air-cooling system of claim 7 further including sensors for mounting on the bed, the tailstock and the headstock and means for signaling when said sensors detect a rate of temperature change greater than a predetermined rate of temperature change.

10. A precision measuring machine comprising:
an elongated bed, ways on the upper part of said bed, a duct substantially enclosing said bed below said ways, at least one bed duct fan connected to said bed duct to deliver ambient air along said bed;
a tailstock slidably mounted on said ways of said bed, a measuring anvil mounted in said tailstock;
a tailstock cap shroud spaced on said tailstock and having walls extending around said tailstock and spaced therefrom;
a tailstock fan mounted on said tailstock and delivering ambient air to said cap shroud so that said cap shroud delivers air around said tailstock;
a tailstock anvil shroud substantially enclosing said tailstock anvil, means for connecting said tailstock fan to said tailstock anvil shroud for delivering ambient air to the interior of said tailstock anvil shroud;
a headstock on said bed, a headstock anvil on said headstock, said headstock anvil facing said tailstock anvil so that a part may be measured therebetween;
a headstock cap shroud positioned on and spaced with respect to said headstock, said headstock cap shroud having walls extending around said headstock;
a headstock fan connected to said headstock cap shroud to deliver air to said headstock cap shroud so that ambient air is delivered around said headstock;
a headstock anvil shroud positioned around and spaced from said headstock anvil;
means connected to said headstock fan for delivering ambient air to the interior of said headstock anvil shroud so that ambient air is delivered to said bed, said tailstock and said tailstock anvil, said headstock and said headstock anvil so as to minimize dimensional changes due to temperature changes.

11. The precision measuring machine of claim 10 wherein said means for delivering air from said tailstock fan to said tailstock anvil shroud is a tube and said means for delivering air from said headstock fan to said headstock anvil shroud is a second tube.

12. The precision measuring machine of claim 11 further including temperature sensors on said bed, said tailstock and said headstock and means connected to said temperature sensors for signaling when the rate of change of sensed temperature exceeds a predetermined value.

* * * * *